United States Patent [19]

Glenn, Jr.

[11] 4,114,721

[45] Sep. 19, 1978

[54] METHOD AND SYSTEM FOR ACOUSTIC NOISE LOGGING

[75] Inventor: Edwin E. Glenn, Jr., Dallas, Tex.

[73] Assignee: Mobil Oil Corporation, New York, N.Y.

[21] Appl. No.: 772,405

[22] Filed: Feb. 28, 1977

[51] Int. Cl.$^2$ ............................................. G01V 1/40
[52] U.S. Cl. ................................... 181/105; 181/102; 340/15.5 TN; 340/524; 340/605
[58] Field of Search ....... 340/6 R, 15.5 TN, 15.5 BA, 340/258 D, 261; 181/102, 105; 73/155, 194 H; 324/2

[56] References Cited

U.S. PATENT DOCUMENTS

| | | | |
|---|---|---|---|
| 2,396,935 | 3/1946 | Walstrom | 181/105 |
| 3,262,515 | 7/1966 | Drum | 340/16 L |
| 3,281,773 | 10/1968 | Newman | 340/15.5 TN |
| 3,371,197 | 2/1968 | Munson | 340/6 R |
| 3,509,764 | 5/1970 | Baldwin et al. | 340/15.5 |
| 3,854,323 | 12/1974 | Hearn et al. | 73/155 |
| 3,908,454 | 9/1975 | Mullins et al. | 181/102 |
| 3,930,556 | 1/1976 | Kusuda et al. | 73/194 A |
| 3,962,674 | 6/1976 | Howell | 340/15.5 AC |

OTHER PUBLICATIONS

Rex et al., "Correlation, Signal Averaging, and Probability Analysis," 11/69, pp. 2–20, Hewlett-Packard Journal, vol. 21, #3.

*Primary Examiner*—Nelson Moskowitz
*Attorney, Agent, or Firm*—C. A. Huggett; George W. Hager, Jr.

[57] ABSTRACT

A pair of acoustic detectors are moved through a well to detect sound at various levels within the well. Electrical signals indicative of the detected sound are applied from the acoustic detectors by way of a conductor cable to uphole recording equipment including an amplifier, spectrum analyzer, crosscorrelator, and recorder. The spectrum analyzer provides frequency spectrums of the amplified signals from the acoustic detectors. The crosscorrelator provides an indication of the time differential between the traveltimes of acoustic noise to the acoustic detectors for use in the location of flow leaks through or behind the well casing.

4 Claims, 4 Drawing Figures

4,114,721

METHOD AND SYSTEM FOR ACOUSTIC NOISE LOGGING

BACKGROUND OF THE INVENTION

This invention relates generally to acoustic well logging and more particularly to the detection of flow leaks through or behind the casing of a well penetrating the subsurface formations.

Acoustical noise logging of wells to determine the location of fluid flow thereinto is well known in the art. For example, in U.S. Pat. No. 2,210,417 to Kinley, leaks through casing are located by determining the location of sound produced by liquid passing through openings in the casing. A sound detector is moved through a well and is connected to an uphole indicating device or recording means. The intensity of sound produced by liquids passing through the casing is thus indicative of leaks in the casing, and location of such leaks is readily discernible from a graphical record of intensity versus the depth of the sound detector within the well. A similar method of determining the location of fluid flow into a well is disclosed in U.S. Pat. No. 2,396,935 to Wahlstrom.

SUMMARY OF THE INVENTION

In a method of identifying and locating noise sources within a borehole, such as gas or liquid leaks through or behind the well casing, the acoustic noise generated by the noise sources is monitored at two spaced-apart locations within the borehole; and signals representative of the monitored acoustic noise at each such location is transmitted uphole. These signals are crosscorrelated and the amount and direction of the crosscorrelation time shift locates the noise source if it is between the two receivers or indicates that it is above or below the two receivers.

More particularly, the borehole is traversed with a pair of axially spaced acoustic detectors. The signals from the acoustic detectors are crosscorrelated uphole. The crosscorrelation time shift between such signals is representative of the time differential between the traveltime of acoustic noise from a noise source to the detectors. By comparing such time shift to the interval acoustic traveltime within the borehole between the detectors, each noise source is identified as being located: (1) between the detectors if the time shift is less than the interval acoustic traveltime, (ii) above the detectors if the time shift is equal to the interval acoustic traveltime in one direction, and (iii) below the detectors if the time shift is equal to the interval acoustic traveltime in the opposite direction. Further, the amount of the time shift indicates the distance of the noise source from the detectors when it is located between the detectors.

DESCRIPTION OF THE PREFERRED EMBODIMENT

Figure 1:
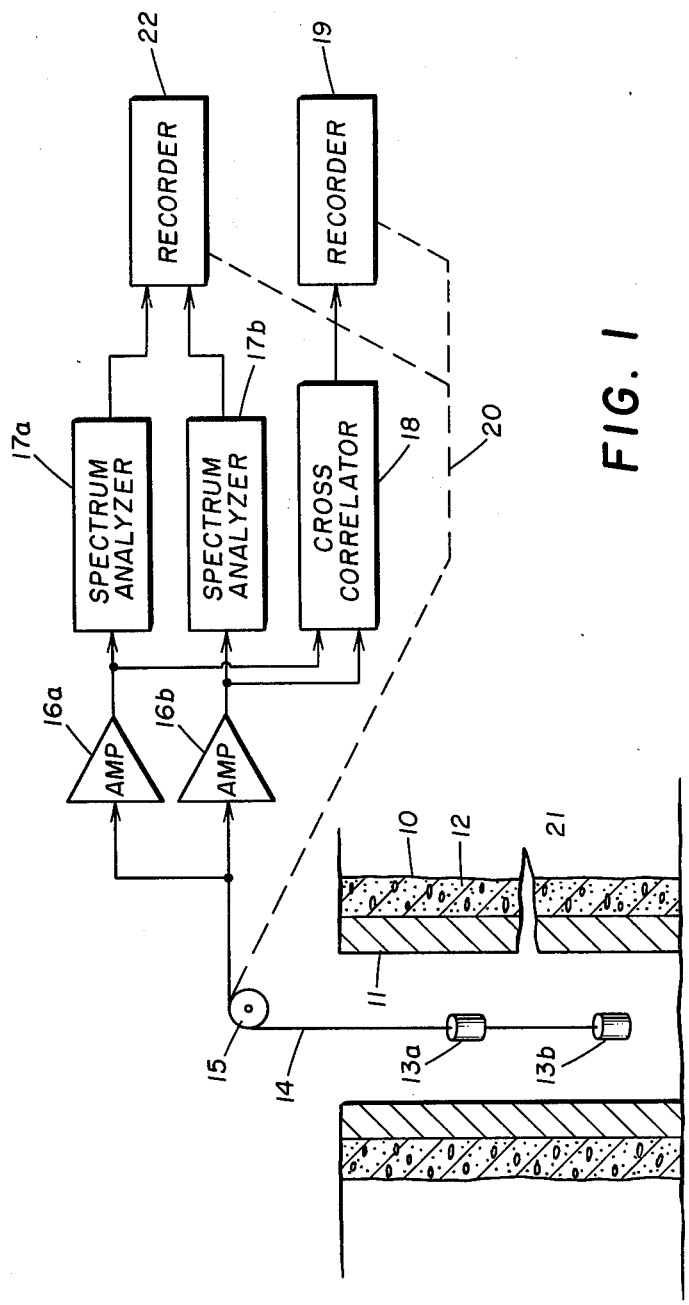
FIG. 1 illustrates an acoustic noise logging system of the present invention for identifying and locating noise sources within a borehole.

Referring now to FIG. 1, there is illustrated an acoustic noise logging system employed for carrying out the method of the present invention. A well 10 traverses the subsurface formations. A well casing 11 is cemented in place with a cement sheath 12. A pair of acoustic detectors 13a and 13b are suspended in the well by a conductor cable 14 which passes over the sheave 15 to the uphole recording equipment and are moved through the well to detect sound at various levels within the well. Acoustic detectors 13a and 13b comprise electroacoustic transducers and amplifiers of conventional acoustic logging tool design. The electrical signals from acoustic detectors 13a and 13b are applied by way of the conductor cable 14 to the surface amplifiers 16a and 16b of the uphole recording equipment. The outputs of amplifiers 16a and 16b are passed through spectrum analyzers 17a and 17b to the recorder 22 which may, for example, be a cathode-ray tube. The outputs of amplifiers 16a and 16b are passed through the crosscorrelator 18 to the recorder 19, which may also be a cathode-ray tube. Both recorders 19 and 22 are correlated with the depth of the acoustic detectors 13a and 13b by means of an electromechanical linkage 20 coupled to the sheave 15 over which the conductor cable 14 passes. Photographs may be taken and labeled with the depth data.

Having described the noise logging system of FIG. 1, the operation of such system in carrying out the method of the present invention will now be described. For purposes of illustration, the noise to be identified and located is generated by one or more gas or liquid leaks through or behind the casing of a well.

In a preferred mode of operation, a reconnaissance run may be made through the borehole with the acoustic detectors, and a reconnaissance log produced. In such a reconnaissance operation, the acoustic detectors 13a and 13b are lowered to a desired location in the borehole, normally below a section of the borehole that is to be explored for noise sources such as created by liquid or gas flow through or behind the casing 11 and cement sheath 12. Such a through casing leak is illustrated at 21 in FIG. 1. The acoustic detectors 13a and 13b are then continuously advanced up the borehole past the section to be explored. During this traveltime, the signals from the acoustic detectors are recorded uphole to produce a reconnaissance log. From such a reconnaissance log, suspected noise sources can be identified and located within a few feet. Such location is only approximate since the acoustic detectors are continuously moving and the outputs from amplifiers 16a and 16b represent a digital sampling of the acoustic detectors' output signals summed over an interval of the borehole sampling. Consequently, the accuracy of the location depends upon the travel rate of the detectors and the rate of sampling of their outputs. Further, both detectors pick up noise signals caused by the logging tool dragging along the surface of the well casing.

After completion of the reconnaissance logging operation and the identification of suspected noise sources from the reconnaissance log, the logging tool is lowered to the approximate location of a suspected noise source or sources. The logging tool is stopped at this location and the signals from acoustic detectors are monitored over a desired time interval. Both acoustic detectors are acoustically isolated from each other. Their output signals include incoherent noise components caused by tool movement within the well casing and coherent noise components caused by a gas or liquid leak through or behind the well casing. Crosscorrelation of these output signals by the crosscorrelator 18 rejects much of the incoherent noise signals due to tool movement within the well casing and, in a sense, detects the similarity of the noise signals from the casing leak. This crosscorrelation has a peak at the time shift that best aligns the signals from the two acoustic detectors. This is representative of the similarity of the noise signals from the noise source of the casing leak.

Figure 2:
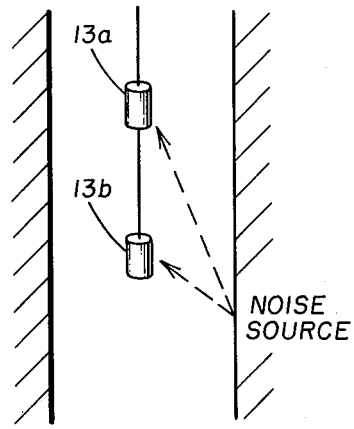
FIGS. 2-4 illustrate the acoustic detectors of the acoustic noise logging system of FIG. 1 as they might be positioned with respect to various noise sources within a borehole.
Figure 3:
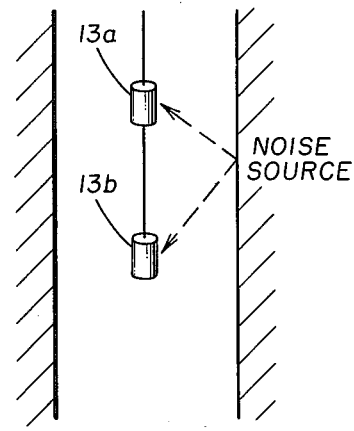
Figure 4:
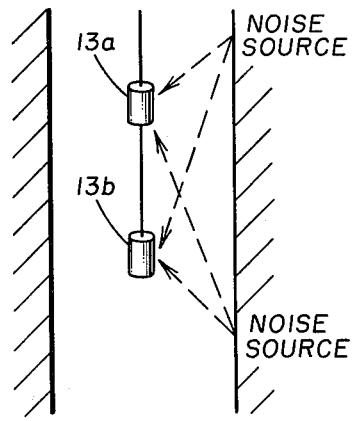

For a more thorough understanding of the crosscorrelation operation in locating casing leaks, reference is made to FIGS. 2–4. Referring initially to FIG. 2, the extra time it takes for noise to travel from the noise source to each of the acoustic detectors 13a and 13b is determined by the time shift of the crosscorrelation operation. If this time shift is equal to the interval acoustic traveltime between the detectors, the noise source is either above or below both of the detectors or it is exactly opposite one of the detectors. The direction of the time shift indicates which of the detectors is nearest to the noise source. As illustrated in FIG. 2, the noise source is nearest to or below the detector 13b.

As the acoustic detectors are positioned so that the noise source is located between them as in FIG. 3, the amount of time shift of the crosscorrelation operation will be less than the interval acoustic traveltime between the detectors; and the direction of the time shift indicates whether the noise source is located nearer to the detector 13a or 13b. When no time shift is needed for correlation, the noise source is midway between the detectors 13a and 13b.

FIG. 4 illustrates the case wherein each acoustic detector receives noise signals from more than one source simultaneously, for example, two noise sources. Crosscorrelation of the signals from the two acoustic detectors will provide two correlation peaks, one at the time shift that best aligns the coherent noise signals received at both detectors from one of the noise sources and another at the time shift that best aligns the coherent noise signals received at both detectors from the other of the noise sources. Analyzation of these two time shifts by amount and direction to locate each of the noise sources is the same as described above in conjunction with FIGS. 2 and 3 for a single noise source. More than two noise sources may be identified and located in similar manner, with the number of correlation peaks identifying the number of noise sources and the amount and directin of each correlation time shift locating each noise source.

In a further aspect of the invention, casing leaks are identified even in the presence of other borehole noise such as that caused by movement of the logging tool through the borehole. Both acoustic detectors 13a and 13b will pick up noise signals caused by the logging tool parts sliding along the metal surface of the pipe in the well. Since both acoustic detectors are acoustically isolated from each other, the noise signals caused by such tool movement will be incoherent as compared to the noise signals from a casing leak which will be coherent. If the crosscorrelation of the signals from the acoustic detectors by means of the crosscorrelator 18 does not satisfactorily remove the incoherent noise signals, a coherence function calculation may be carried out through use of the spectrum analyzers 17a and 17b. This coherence function, CF, is a squared power ratio derived from multiplying the cross spectral density, CSD, of the acoustic detector signals by its complex conjugate and dividing their product by the product of the power spectral densities, PSD, of the signals from the acoustic detectors 13a and 13b:

$$CF^2_{(13a)\,(13b)} = \frac{CSD_{(13a)\,(13b)}(f) \cdot CSD^*_{(13a)\,(13b)}(f)}{PSD_{(13a)\,(13a)}(f) \cdot PSD_{(13b)\,(13b)}(f)} \quad (1)$$

$$0 \leq CF^2_{(13a)\,(13b)} \leq 1 \quad (2)$$

The power spectral density provides the frequency spectrum of the acoustic detector signals. The cross spectral density is the frequency domain counterpart of the crosscorrelation function in the time domain.

This coherence function shows the coincidence of harmonic content of the acoustic detector signals. High coherence should prevail over some large portion of the spectrum, primarily that portion due to the noise signal from the casing leak. If the coherence function is in excess of about 0.8, a linear relationship between the acoustic detector signals is indicated, that is, the noise signals received by the acoustic detectors are primarily from the same noise source.

During logging operations, a coherence spectra calculated on frequent samples and compared with depth will indicate low coherence when no casing leak is present, and this coherence will approach a maximum of unity when the acoustic detectors are located close to a casing leak. Consequently, a reconnaissance run (i.e., continuous tool movement) through the well will detect noise signals from a casing leak and will indicate the approximate location of the casing leak. Subsequent station measurements (i.e., tool stopped) in the well will permit the identification of single or multiple casing leaks and the analysis of the type of casing leak or leaks (i.e., gas or liquid).

In the above-described preferred embodiment, the acoustic detectors 13a and 13b are lead-zirconate-titanate piezoelectric ceramic transducers No. 5500 supplied by Channel Industries, Inc., 839 Ward Drive, Santa Barbara, Calif. 93111. The spectrum analyzers 17a and 17b and crosscorrelator 18 are supplied by the Time/Data Company, 2855 Bowers Avenue, Santa Clara, Calif. 95051, as integral parts of the TDA-30L time series analyzer system which performs a broad range of preprogrammed time series analysis techniques.

Although the present invention has been described in connection with a preferred embodiment, various modifications and changes may be made without departing from the spirit and scope of the present invention as set forth in the appended claims.

I claim:

1. A method of logging a borehole for noise sources within a well, comprising the steps of:
    (a) traversing the borehole with a logging tool having at least two axially spaced acoustic noise detectors for monitoring the acoustic noise within the borehole,
    (b) recording a pair of first signals representative of both coherent and incoherent acoustic noise monitored by said detectors in correlation with depth to obtain a reconnaissance log,
    (c) measuring the harmonic content of each of the signals from the acoustic detectors,
    (d) determining the coherence of said measured harmonic contents as a function of depth of the logging tool within the borehole, coherence over some portion of the frequency spectrum indicating that the noise detected by the acoustic detectors at the depth associated with said coherence is coherent noise produced primarily by a casing leak, (e) locating said logging tool at one or more depths within the borehole identified in step (d), (f) monitoring the acoustic noise at said one or more depths with said detectors for a desired time interval, (g) crosscorrelating a pair of second signals representative of the acoustic noise monitored by said detectors at said one or more depths to determine the time shift between said pair of second signals, each time shift so determined being representative of the time differential between the traveltime of coherent acoustic noise from a casing leak to said detectors, and (h) identifying the location of said casing leak with respect to said detectors based upon the amount and direction of said time shift.

2. The method of claim 1 wherein said step of identifying the location of a casing leak comprises the steps of:

(a) comparing said time shifts to the interval acoustic traveltime within the well between said detectors, and (b) identifying a casing leak as being located:
  (i) between said detectors if the time shift is less than the interval acoustic traveltime,
  (ii) above said detectors if the time shift is equal to the interval acoustic traveltime in one direction, and
  (iii) below said detectors if the time shift is equal to the interval acoustic traveltime in the opposite direction.

3. The method of claim 2 wherein said casing leak is identified as located midway between said detectors if there is no time shift between said pair of second signals.

4. The method of claim 2 wherein the distance of said casing leak from said detectors is determined by the amount of said time shift.

* * * * *